United States Patent
Desai et al.

(10) Patent No.: US 12,323,487 B2
(45) Date of Patent: Jun. 3, 2025

(54) IMPLEMENTING A TARGET BLOCK COMMAND ON AN UNSTRUCTURED DATA STORAGE NODE

(71) Applicant: Microsoft Technology Licensing, LLC, Redmond, WA (US)

(72) Inventors: Shantanu Desai, Bangalore (IN); Kantha Rao Dammalapati, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 285 days.

(21) Appl. No.: 17/965,525

(22) Filed: Oct. 13, 2022

(65) Prior Publication Data
US 2024/0129365 A1    Apr. 18, 2024

(51) Int. Cl.
*G06F 15/16*    (2006.01)
*G06F 3/06*    (2006.01)
*H04L 67/1097*    (2022.01)

(52) U.S. Cl.
CPC ........ *H04L 67/1097* (2013.01); *G06F 3/0611* (2013.01); *G06F 3/0659* (2013.01); *G06F 3/067* (2013.01)

(58) Field of Classification Search
CPC .. H04L 67/1097; G06F 3/0611; G06F 3/0659; G06F 3/067
See application file for complete search history.

(56) References Cited

U.S. PATENT DOCUMENTS

| | | | | |
|---|---|---|---|---|
| 7,200,726 | B1* | 4/2007 | Gole ................... | G06F 11/2082 714/15 |
| 10,268,410 | B2* | 4/2019 | Pattabiraman .......... | G06F 12/02 |
| 10,275,611 | B1* | 4/2019 | Yu ........................... | G06F 16/33 |
| 2016/0306591 | A1* | 10/2016 | Ellis ....................... | G06F 3/061 |

(Continued)

FOREIGN PATENT DOCUMENTS

EP    4044517 A1    8/2022

OTHER PUBLICATIONS

"3GPP TS 29.598: 3rd Generation Partnership Project; Technical Specification Group Core Network and Terminals; 5G System; Unstructured Data Storage Services Stage 3", 3GPP V17.0.0, Dec. 2020, 90 pages.

(Continued)

*Primary Examiner* — Oleg Survillo
(74) *Attorney, Agent, or Firm* — Ray Quinney & Nebeker; James Bullough

(57) ABSTRACT

The present disclosure relates to systems, methods, and computer-readable media for extending functionality of unstructured data storage function (UDSF) nodes in supporting features and functionality of services and applications that are accessible via a core network. The systems described herein include a UDSF node having a UDSF data management system that enables network functions to interact with and modify data resources separately maintained by the UDSF node(s). A network function may selectively target discrete sets of blocks of data on records to access without accessing entire records and without issuing redundance application programming interface (API) calls to the USDF node(s). the UDSF node may be implemented in a core network to enhance network functions in fifth generation (5G) and beyond communication environments.

20 Claims, 6 Drawing Sheets

(56) References Cited

U.S. PATENT DOCUMENTS

| | | | |
|---|---|---|---|
| 2019/0005050 A1* | 1/2019 | Proux | G06F 40/157 |
| 2020/0241799 A1* | 7/2020 | Kanno | G06F 3/064 |
| 2021/0165719 A1* | 6/2021 | Kumarasamy | G06F 3/065 |
| 2023/0153214 A1* | 5/2023 | Sun | G06F 11/1092 714/3 |
| 2023/0393976 A1* | 12/2023 | Tang | G06F 3/0652 |
| 2024/0220106 A1* | 7/2024 | Patel | G06F 3/0659 |

OTHER PUBLICATIONS

"3GPP TS 36.212: 3rd Generation Partnership Project; Technical Specification Group Radio Access Network; Evolved Universal Terrestrial Radio Access (E-UTRA); Multiplexing and channel coding", 3GPP V11.3.0, Jun. 2013, 84 pages.

International Search Report and Written Opinion received for PCT Application No. PCT/US23/031775, mailed on Nov. 16, 2023, 15 pages.

* cited by examiner

PUT / {realmId}/{storageId}/records/{recordId}/blockIdList

FIG. 4A

GET / {realmId}/{storageId}/records/{recordId}/blockIdList

FIG. 4B

MOD / {realmId}/{storageId}/records/{recordId}/blockIdList

FIG. 4C

DEL / {realmId}/{storageId}/records/{recordId}/blockIdList

FIG. 4D

IMPLEMENTING A TARGET BLOCK COMMAND ON AN UNSTRUCTURED DATA STORAGE NODE

BACKGROUND

Cellular networks can provide computing devices (e.g., mobile devices) with access to services available from one or more data networks. A cellular network is typically distributed over geographical areas that often include base stations, core networks, and/or edge networks that collectively provide a variety of services and coverage to end-user devices (e.g., mobile devices). The devices of the cellular network provide reliable access to a data network by mobile devices over a wide geographic area. In many instances these cellular networks provide mobile devices access to the cloud.

As noted above, cellular networks include a number of network components. For example, cellular networks often include a radio access network (RAN), an edge network, and a core network. In many instances, the RAN may include base stations having components thereon that communicate wirelessly with user devices (e.g., mobile devices or other endpoints) and facilitate interaction with other components of a core network and/or cloud computing system. In addition, the core network may include a variety of functions and nodes that provide services to a client.

In recent years, cellular networks have provided a variety of functions that enhance capabilities of services provided to end-users. For example, many core networks have provided data storage function nodes that provide data storage capabilities to services and applications hosted by the cellular network. While these storage function nodes have extended services and applications offered by the cellular network, conventional approaches to using the storage resources suffer from a number of drawbacks and limitations. For example, conventional storage functions often suffer from inefficiencies in how the specific data is read, modified, or otherwise accessed. Furthermore, conventional implementations of these storage function nodes are limited in the types of operations that can be applied to the data resources maintained on the storage function nodes.

These and other problems exist in connection with implementing data storage function nodes that support various data operations on the data maintained thereon.

BRIEF DESCRIPTION OF THE DRAWINGS

FIG. 4A illustrates an example create operation command in accordance with one or more embodiments.

FIG. 4B illustrates an example read operation command in accordance with one or more embodiments.

FIG. 4C illustrates an example update command in accordance with one or more embodiments.

FIG. 4D illustrates an example delete command in accordance with one or more embodiments.

DETAILED DESCRIPTION

Figure 1:
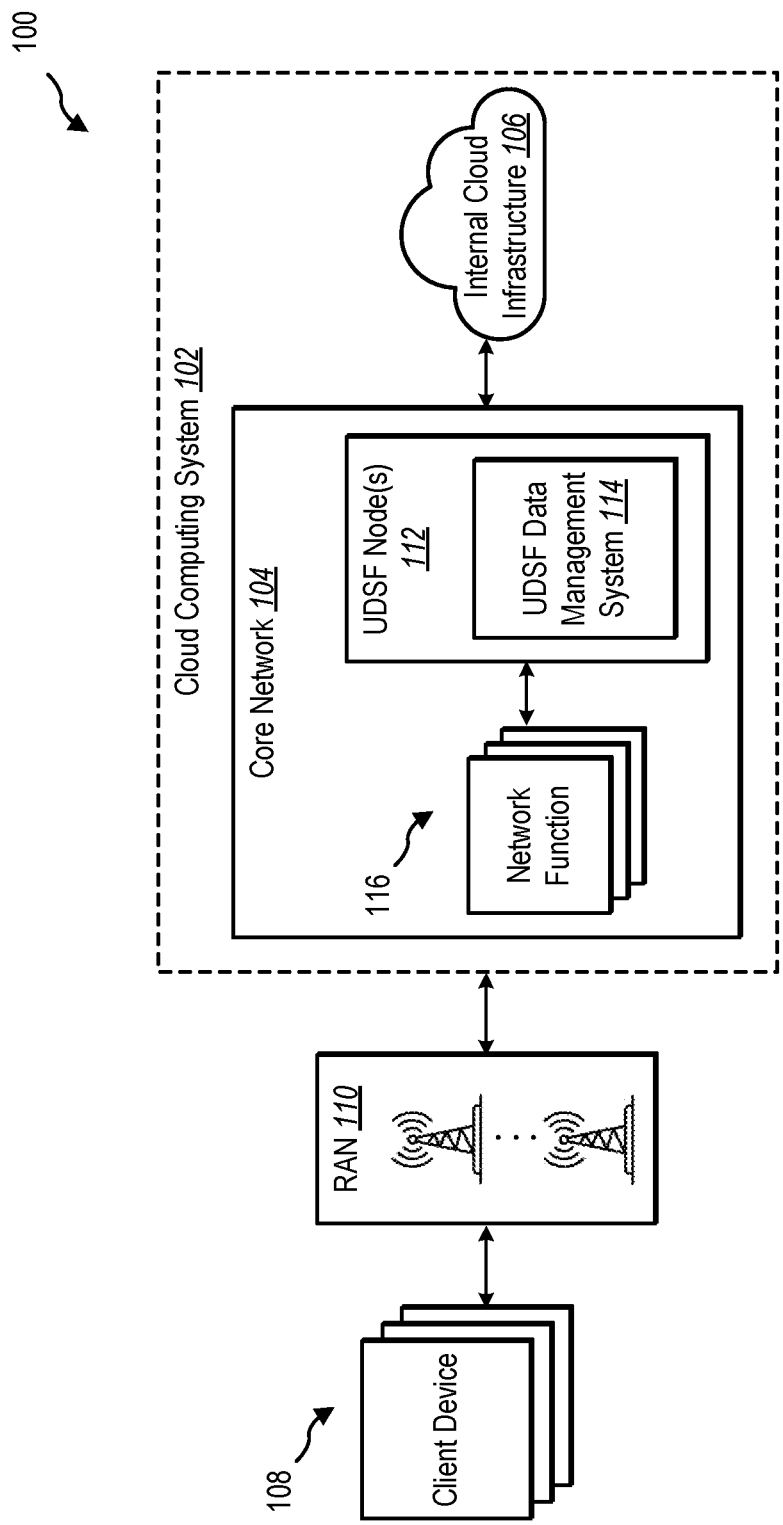
FIG. 1 illustrates an example environment including a core network having unstructured data storage function (UDSF) nodes implemented thereon in accordance with one or more embodiments.

The present disclosure relates generally to systems, methods, and computer-readable media for extending functionality of unstructured data storage function (UDSF) nodes in supporting features and functionality of services and applications that are accessible via a core network. In particular, as will be discussed in further detail below, the present disclosure involves implementation of a UDSF node having a UDSF data management system that enables applications and services (e.g., a network functions) to interact with and modify data on the UDSF node. For example, the UDSF data management system provides features and functionality that enable network functions (and other services or applications) to modify discrete sets of blocks of data on records that are maintained on the UDSF node(s). As will be discussed below, the UDSF data management system may be implemented on UDSF nodes on a core network to facilitate greater flexibility and lower latency in fifth generation (5G) and beyond communication environments.

As an illustrative example, in a third-generation partnership project (3GPP) environment (e.g., a 5G cellular network), a UDSF data management system may be implemented on a UDSF node to facilitate receiving and processing a variety of operation commands on data maintained by the UDSF node. For instance, the UDSF data management system may maintain a record on a UDSF node that includes a set of blocks (e.g., data blocks). The UDSF data management system may receive, from a network function having authorized access to the record, an operation command including instructions to perform a command on an identified subset of blocks from the set of blocks of the record. The UDSF data management system may cause the command to be executed on the identified subset of blocks indicated by the operation command.

As will be discussed herein, the present disclosure includes a number of practical applications having features described herein that provide benefits and/or solve problems associated with maintaining and modifying data maintained on UDSF nodes and providing access to the data to a variety of services and applications. Some example benefits are discussed herein in connection with various features and functionalities provided by a UDSF data management system. It will be appreciated that benefits discussed herein are provided by way of example and are not intended to be an exhaustive list of all possible benefits of the UDSF data management system.

For example, the UDSF nodes and UDSF data management system described herein provides access to unstructured data to various services and applications that are implemented on different devices from the UDSF nodes. This facilitates an improvement over conventional (e.g., pre-5G) cellular environments in which services and applications (e.g., network functions) would maintain data on the same server node to support features of the functions implemented thereon. Indeed, it will be appreciated that many previous generation (e.g., pre-5G) wireless communication environments do not support UDSF nodes altogether. This previous architecture would often result in robust services that were unique to different types of services and presented a problem when scaling resources to accommodate an ever-growing base of end-users.

In addition, the UDSF data management system enables services and applications to create, modify, or otherwise access data on the UDSF nodes for selectively sized sets of data blocks. Indeed, where conventional systems including UDSF nodes typically involve modification of an entire record when accessing more than one block of data, the UDSF data management system provides a mechanism whereby a network function may indicate a discrete range of blocks within a single operation command. The UDSF data management system provides an interface that allows the select range of blocks to be modified, deleted, read, or otherwise accessed without requiring that the entire record or storage volume be modified or accessed, thus providing enhanced flexibility and faster speeds when accessing data blocks on a UDSF node.

Furthermore, by indicating a range of blocks within an operation command, the UDSF data management system enables transmission and execution of an operation command using a single application programming interface (API) call. Indeed, in conventional systems, where modifying a range of blocks would typically require a separate API call for each discrete data block, the UDSF data management system provides the capability to modify multiple blocks within a single record using a single API call. This reduces latency over multi-API calls and, as discussed above, further enhanced flexibility and scalability over conventional systems for managing and modifying data maintained on UDSF nodes.

The features and functionality of the UDSF data management system described herein are further extensible to a wide variety of commands and to future generations of wireless communication environments. For example, while one or more embodiments described herein relate specifically to UDSF nodes in a core network in a 5G cellular environment, the UDSF data management system may implement features described herein in any generation of wireless communication networks in which unstructured data storage nodes are used or in which separate nodes are used to provide data resources to applications and services of a cloud computing system.

As illustrated in the foregoing discussion and as will be discussed in further detail herein, the present disclosure utilizes a variety of terms to describe features and advantages of methods and systems described herein. Some of these terms will be discussed in further detail below.

As used herein, a "cloud computing system" or "distributed computing system" may be used interchangeable to refer to a network of connected computing devices that provide various services to computing devices (e.g., customer devices). For instance, as mentioned above, a cloud computing system can include a collection of physical server devices (e.g., server nodes) organized in a hierarchical structure including clusters, computing zones, virtual local area networks (VLANs), racks, fault domains, etc. In one or more embodiments described herein a portion of the cellular network (e.g., a core network) may be implemented in whole or in part on a cloud computing system. In one or more embodiments a data network may be implemented on the same or on a different cloud computing network as the portion of the cellular network.

As used herein, a "UDSF node" refers to a computing device (e.g., a server node) that has storage resources thereon that are made accessible to various services and/or applications on the cloud computing system. In one or more embodiments, a UDSF node refers to a server node in a core network that provides access to unstructured data to one or multiple network functions that are co-located on the core network. In one or more embodiments, the UDSF node is an unstructured data storage function as defined in a current or previous iteration of the 3GPP technical specification (e.g., 3GPP document 29.598) which defines a storage service for applications that are accessible via wireless communication networks.

In one or more embodiments described herein, an operation is performed with respect to a block of data. As used herein, a "block" or "data block" may refer to a single unit of accessible data or storage that is stored or otherwise maintained on a UDSF node. A block may refer to a storage space whether or not the space is occupied by readable data. For example, a block may refer to an empty space prior to creation of the data on the block. The block may similarly refer to a space having data previously or currently stored thereon and which is accessible (or was previously accessible) to a network function.

A block may be one of a set of blocks that make up a larger set of data. For example, as used herein, a "record" or "block record" may refer to a set of blocks that collectively form a data record. Similarly, a record may be one of multiple records that make up a storage volume. Further, a storage volume may be one of multiple volumes that make up a realm of storage identifiers. These specific granularities of storage spaces may be different in size and scope between different implementations of the UDSF data management system. Additional detail will be discussed below in connection with various examples.

As used herein "network function" may refer to an entity in a communication environment (e.g., a communication network) that has access to the storage maintained on a UDSF node. For example, a network function may refer to an application or service provided by a cloud computing system that makes use of one or more records (e.g., a storage volume) that is accessible to the respective application or service via an API. The network function may be co-located on the core network with the UDSF node(s). Examples of network functions include, but are not limited to, session management functions (SMFs), management functions (MFs), and user plane functions (UPFs). Indeed, a network function may refer to any function or entity in a communication environment (e.g., 5G or beyond cellular environment) that makes use of the data resources offered by UDSF nodes.

As used herein, an "operation command" refers to a set of instructions that may be executed on a UDSF node with respect to data stored thereon. An operation command may be created and transmitted by a network function and provided to a UDSF node via an API in accordance with one or more embodiments described herein. As will be discussed in further detail below, the operation command may include an identification of a type of operation to be executed on blocks of data as well as a sequence of identifiers that are used to identify the discrete portion of data maintained on the UDSF node.

Additional detail will now be provided regarding systems described herein in relation to illustrative figures portraying example implementations. For example, FIG. 1 illustrates an example environment 100 for implementing features and functionality of a UDSF data management system in accordance with examples described herein.

As shown in FIG. 1, the environment 100 may illustrate portions of a communication environment (e.g., a cellular network, such as a 5G cellular network). For example, the environment 100 may include a cloud computing system 102 having a core network 104 and an internal cloud infrastructure 106. The environment 100 may additionally include a plurality of client devices 108 and a radio access network (RAN) 110. These components 104-110 may collectively form a public or private cellular network, which include a RAN, a core network, and a data network. Moreover, any portion(s) of the cellular network may be implemented on a cloud computing system inclusive of the core network 104 and the internal cloud infrastructure 106 (e.g., a cloud datacenter). In one or more embodiments, components of the core network 104 and/or RAN 110 may be implemented as part of an edge network or other decentralized infrastructure in which computing nodes of the cloud computing system 102 are physically implemented at locations that are in proximate to or otherwise within closer vicinity of the client devices 108 than other components of the cloud computing system 102 (e.g., the internal cloud infrastructure 106)

The client devices 108 may refer to a variety of computing devices or device endpoints including, by way of example, a mobile device such as a mobile telephone, a smartphone, a personal digital assistant (PDA), a tablet, or a laptop. Alternatively, one or more of the client devices 108 may refer to non-mobile devices such as a desktop computer, a server device (e.g., an edge network server), or other non-portable devices. In one or more embodiments, the client devices 108 refer more generally to any endpoint capable of communicating with devices on a cloud computing system 102, such as Internet of Things (IoT) devices, or other Internet-enabled devices. In one or more embodiments, the client devices 108 refer to applications or software constructs on corresponding computing devices.

The RAN 110 may include a plurality of RAN sites. In one or more embodiments, each RAN site may include one or more base stations and associated RAN components. While the RAN 110 may include components that are entirely separate from the core network 104, one or more embodiments of the environment 100 may include one or more RAN components or services traditionally offered by a RAN site that are implemented on the cloud computing system 102 (e.g., as part of the core network 104). Indeed, as communication networks become more complex and further decentralized, one or more components of the RAN 110 may be implemented as virtualized components hosted by server nodes of the cloud computing system 102, such as on server nodes of an edge network, core network 104 and/or on datacenters of the internal cloud infrastructure 106 (or across multiple cloud components). In one or more embodiments described herein, the various network functions may refer to not only those functions that are serviced as part of the core network 104, but as one or more virtualized RAN components implemented as a service or otherwise hosted on the cloud computing system 102.

As shown in FIG. 1, the core network 104 may include a UDSF node 112 having a UDSF data management system 114 implemented thereon. The core network 104 may include any number of UDSF nodes 112 that provide access to storage resources maintained thereon. As shown in FIG. 1, the core network 104 may include a plurality of network functions 116, which may refer to a variety of entities that are configured to access and make use of the storage resources hosted by the UDSF node(s) 112. While FIG. 1 shows a plurality of network functions 116 and a single UDSF node 112, this configuration is provided by way of example. The core network 104 may include any number of network functions in communication with any number of UDSF nodes.

As will be discussed in further detail below, the network functions 116 may communicate with and provide operation commands to the UDSF node(s) 112 in accordance with one or more embodiments described herein. Indeed, as will be discussed in connection with various examples, the UDSF data management system 114 may interact with the network functions 116 to receive an operation command that follows a specific format, and which includes instructions that facilitate executing a command on a range of data blocks maintained on the UDSF node(s) 112. As mentioned above, the UDSF data management system 114 may enable the network functions 116 to target specific ranges of blocks within records of blocks in a way that allows the network functions 116 to fully utilize the data storage capabilities offered by UDSF node(s) 112.

Figure 2:
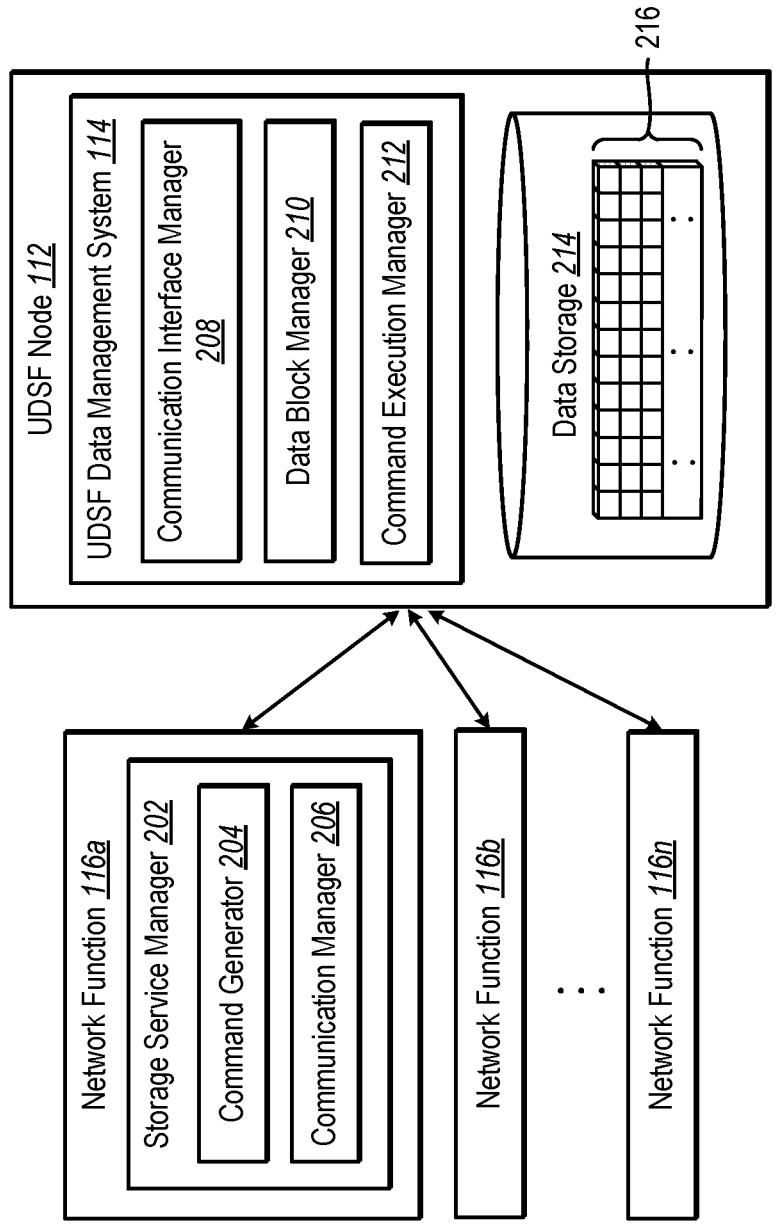
FIG. 2 illustrates an example implementation of a network function accessing a storage resource on a UDSF node in accordance with one or more embodiments.

FIG. 2 illustrates an example implementation in which a plurality of network functions 116a-n may communicate with an example UDSF node 112 to access data maintained on the UDSF node 112. As noted above, the UDSF node 112 and the network functions 116a-n may be implemented on a core network within a 5G communication environment. Moreover, the network functions 116a-n may refer to a variety of different network functions that may each access data stored on the UDSF node 112 (and other UDSF nodes). The UDSF node 112 and the network functions 116a-n may include similar features and functionality as other UDSF nodes and network functions described herein, such as network functions 116 and UDSF node(s) 112 discussed above in connection with FIG. 1.

As shown in FIG. 2, the plurality of network functions 116a-n may include a first network function 116a. The first network function 116a may include a storage service manager 202 for managing interactions (e.g., operation commands) between the first network function 116a and the UDSF node 112. As shown in FIG. 2, the storage service manager 202 may include a command generator 204 and a communication manager 206.

The command generator 204 may be configured to create a variety of operation commands to be executed by the UDSF data management system 114 on the UDSF node 112. For example, the command generator 204 may create an operation command that includes an identifier of an operation to be performed on stored data as well instruction indicating a storage location of the data on which the command should be executed. Additional information associated with the operation command, including the different types of commands and ways in which the location of the storage can be indicated, will be discussed in connection with various examples below.

As shown in FIG. 2, the storage service manager 202 may additionally include a communication manager 206. The communication manager 206 may be tasked with facilitating communication of information between the first network function 116a and the UDSF node 112. This may include acts associated with generating a data packet including the operation command and transmitting the operation command for execution on the UDSF node 112. The communication manager 206 may further receive information from the UDSF node 112 that conveys knowledge of where the data is stored and specification data of how the data can be accessed by the first network function 116a.

It will be appreciated that while the additional network functions 116-n do not show the storage service manager 202 thereon, a similar storage service manager may be implemented on each of the additional network functions 116b-n to provide similar features and functionalities associated with generating and communicating operation commands between the plurality of network functions 116a-n and the UDSF node 112. While not shown in FIG. 2, it will be understood that the network functions 116a-n and the UDSF node 112 may communicate directly or indirectly through a network. For instance, the devices shown in FIG. 2 may communicate via one or multiple networks and may use one or more communication platforms or technologies suitable for transmitting data. This network may refer to any data link that enables transport of electronic data (e.g., operation commands) between devices and/or modules of the illustrated components. Networks used to facilitate communication between devices described herein may refer to a hardwired network a wireless network, or a combination of hardwired and wireless network(s). In one or more embodiments, the devices may communicative over a network including the Internet.

Additional detail will now be given in connection with the UDSF data management system 114 implemented on the UDSF node 112. As shown in FIG. 2, the UDSF data management system 114 may include a communication interface manager 208. The communication interface manager 208 may enable communication between the UDSF node 112 and other devices on and outside the core network. In the context of the environment shown in FIG. 2, the communication interface manager 208 may enable communication between the UDSF node 112 and the network functions 116a-n.

In one or more embodiments, the communication interface manager 208 may enable communication by authenticating the network functions 116a-n. For example, the communication interface manager 208 may authenticate an identity of the network functions 116a-n to ensure that the network function 116a-n is known to the UDSF node 112. In one or more embodiments, the communication interface manager 208 may communicate information associated with a location of the storage space accessible to the respective network functions 116a-n.

In one or more embodiments, the communication interface manager 208 establishes or exposes an API to the network functions 116a-n to enable the network functions 116a-n to interact directly with the storage spaces. Indeed, as will be discussed in one or more embodiments, the communication interface manager 208 may establish the protocol that enables the network functions 116a-n to access ranges of data blocks based on a single API call communicated to the communication interface manager 208.

As further shown in FIG. 2, the UDSF data management system 114 may include a data block manager 210. The data block manager 210 may provide functionality related to allocating or otherwise assigning blocks of data to one or more network functions 116a-n. In one or more embodiments, this may involve governing permissions associated with allowing some or all of the network functions to read, modify, or otherwise access certain records on the UDSF node 112. For example, the data block manager 210 may govern permissions that allow certain network functions to execute select operation commands. For instance, a first network function 116a may be allowed to create, edit, delete, and read a specific data record (or select range of data blocks) while only allowing other network functions 116b-n to read the data record (or not access the data record at all).

As further shown in FIG. 2, the UDSF data management system 114 may include a command execution manager 212. The command execution manager 212 may provide functionality related to parsing received operation commands and executing the commands on the indicated blocks of data. For example, the command execution manager 212 may receive an operation command including a sequence of identifiers, which the command execution manager 212 may parse and carry out execution of the command in accordance with the instructions indicated within the body of the operation command. Additional detail in connection with receiving and executing operation commands will be discussed below.

As shown in FIG. 2, the UDSF node 112 includes a data storage 214 including data resources that are accessible to one or more of the network functions 116a-n. In the illustrated example, the data storage 214 includes a collection of data blocks 216, which may be organized or subdivided in a number of ways. For example, as mentioned above, the collection of data blocks 216 may be divided into records, which may be divided into one or more storage volumes, which may be divided into storage realms. This hierarchical structure in which the collection of data blocks 216 may be organized may differ between different implementations of the systems described herein.

As used herein, the collection of data blocks 216 may be categorized at different levels of granularity, which each of the levels of granularity being associated with different devices and/or sessions between devices. As a non-limiting example, in one or more embodiments, the collection of data blocks 216 may include a plurality of individual blocks having associated block identifiers. The plurality of individual blocks may be grouped in discrete data records. The records may refer to groupings of blocks that are associated with a particular session of an application. Thus, a record may refer to any of a range of data blocks that are associated with an application or service. In one or more embodiments, a record may refer to a range of blocks that are associated with a particular processing entity of a network function. In the example shown in FIG. 1, the record may refer to a grouping of data blocks assigned to a first network function 116a, a specific session that is hosted by the first network function 116a (e.g., where the network function may host multiple sessions), or a specific processing entity or microservice contained within the first network function 116a.

As noted above, the record may be one of a plurality of records contained within a storage volume (e.g., associated with a storage identifier). The storage volume may refer to the collection of data blocks 216 included within the data storage 214. Alternatively, the storage volume may refer to a subset of multiple records included within the data storage 214 hosted by the UDSF node 112. The storage volume may be one of a plurality of storage volumes available to the network functions 116a-n. Multiple storage volumes (e.g., across multiple UDSF nodes) may be grouped within a single storage realm. The storage realm may refer to collections of storage blocks across multiple UDSF nodes, such as those include within a certain region or within a particular core network.

As noted above, each of the above examples are not intended to be limiting to a specific association between granularities of data blocks and specific entities of the core network. Moreover, it will be understood that the specific sets of data blocks that are associated with records, storage volumes, and/or storage realms may be defined by a technical specification of the UDSF node 112 and/or standards that define how various operations may be performed on collections of data blocks maintained on one or across multiple UDSF nodes. Thus, the specific division and granularity of these specific hierarchical levels of storage may differ based on specifications of the particular hardware.

Figure 3:
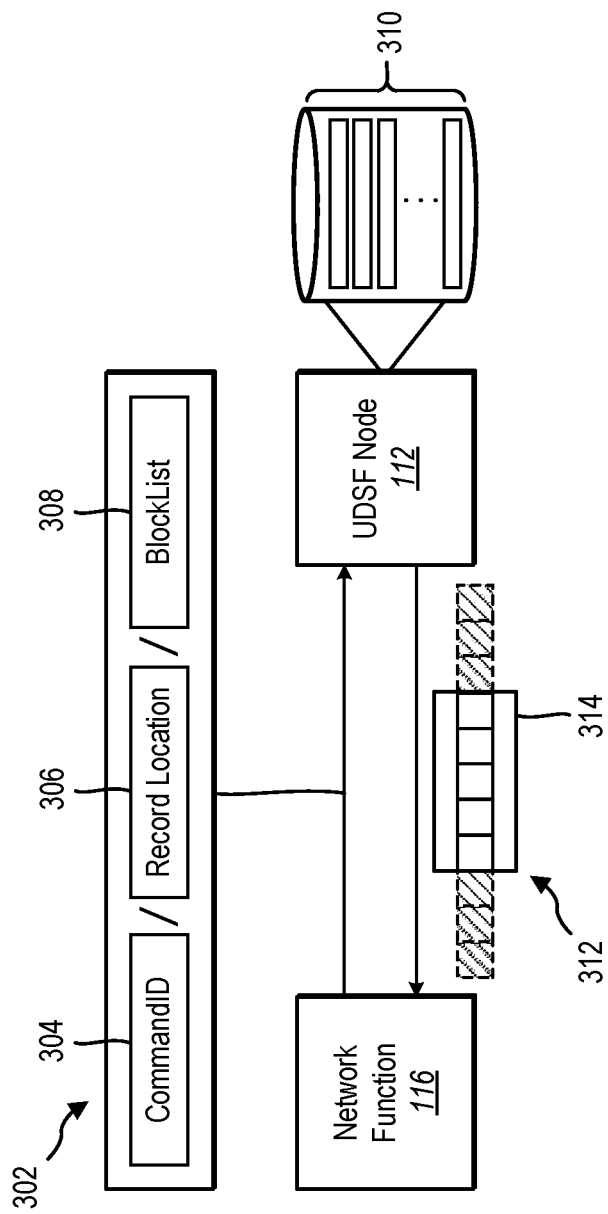
FIG. 3 an example implementation of an operation command provided to a UDSF node in accordance with one or more embodiments.

Additional detail will now be given in connection with an example operation command. In particular, FIG. 3 illustrates an example implementation of a network function 116 and a UDSF node 112 having data resources maintained thereon that are accessible to the network function 116. As shown in FIG. 3, the network function 116 may generate an operation command 302 and provide the operation command 302 to the UDSF node 112. In one or more embodiments, the network function 116 provides the operation command 302 by making an API call via an interface that is exposed by the UDSF node 112.

As shown in FIG. 3, the operation command 302 includes a number of portions indicating instructions that enable the UDSF node 112 to receive, parse, and execute the command. For example, the operation command 302 may include a command identifier 304 indicating a type of command to be performed on a portion of data. Examples of different command identifiers corresponding some example commands are discussed below in connection with FIGS. 4A-4D. In one or more embodiments, the command identifier 304 includes a single command identifier corresponding to a type of operation to perform on an indicated range of blocks. Alternatively, in one or more implementations, the command identifier 304 includes multiple command identifiers that may be performed on the indicated range of blocks (e.g., using a single API call for the multiple commands or, alternatively, using a single API call for each of the indicated commands from the operation command 302).

The operation command 302 may further include additional portions indicating locations of data on which the command should be executed. For example, the operation command 302 may include a record location 306 indicating a location of a data record on which the command corresponding to the command identifier 304 is to be executed. The record identifier may include a sequence of identifiers indicating a location within a hierarchical structure of locations that the record can be found. As indicated above, the record location may include a sequence of location identifiers including a realm identifier (e.g., an identifier of a UDSF node or set of UDSF nodes), a storage volume identifier (e.g., an identifier of a specific set of records associated with the network function 116 or specific process of the network function 116), and a record identifier indicating a discrete set of data blocks associated with a particular session or service and maintained within the UDSF node 112.

The operation command 302 may additionally include a block list 308 indicating a subset of blocks from the identified record on which the operation is to be executed. The block list 308 may identify the range of blocks within the corresponding record in a variety of ways. For example, the block list 308 may indicate a range of blocks by identifying each of the relevant blocks on which the operation is to be performed. The block list 308 may indicate a range of blocks by identifying endpoint blocks to indicate a subset of contiguous blocks on which the operation is to be performed. The block list 308 may indicate a range of blocks within the particular record or, alternatively, indicate a range of block addresses (e.g., full block addresses) within the storage volume on the UDSF node 112. Indeed, the block list 308 may indicate the specific subset of blocks in accordance with a format specified by the API and/or specifications that define how the blocks should be identified within the operation command 302.

In addition to the illustrated portions of the operation command 302, the operation command 302 may further include values or specific data to include within the corresponding blocks of data. In particular, where an operation command 302 is a command to create or modify blocks of a particular record, the operation command 302 may further include the specific values that may be included as part of the create or modify operation. For example, in the event of a create operation, the operation command 302 may include values to include within the new blocks of data. In the event of the modify operation, the operation command 302 may include values to use in place of previous values that occupy the indicated data blocks. Other operations may not necessarily include specific values (e.g., delete or read operations).

Based on the operation command 302, the UDSF node 112 (or the network function 116) may identify the subset of blocks from a collection of records 310 maintained on the UDSF node 112. In the example operation command 302 shown in FIG. 3, the UDSF node 112 may execute the command on the specific range of data blocks within the identified record. In the illustrated example, the UDSF node 112 may return an identified record 312 in which a subset of blocks 314 from the record 312 are read, modified, created, deleted, or otherwise accessed based on the command identifier 304 included within the operation command 302. In one or more embodiments, the UDSF node 112 may return only the portion of the record 312 on which the operation was performed (e.g., the subset of blocks). In one or more embodiments, the UDSF node 112 may simply provide an indication that the command has been executed (e.g., rather than returning the identified record 312 having the associated subset of blocks 314).

Referring now to FIGS. 4A-4D, various examples of operation commands may be performed on select ranges of blocks based on features of operation commands that are generated and provided to USDF nodes in accordance with one or more embodiments described herein. As noted above, specific operation commands may refer to a variety of command types including, by way of example, create commands, read commands, update commands, and delete commands. As used herein, these operation commands serve to provide examples of API calls that can be made in selectively executing operations on indicated subsets of blocks from records maintained on a given UDSF node. FIGS. 4A-4D illustrate non-limiting examples of these different command types.

For example, FIG. 4A illustrates an example create command 402. In this example, a create command 402 may be associated with inserting data into an identified subset of blocks without inserting data within one or more blocks outside the identified subset. As shown in FIG. 4A, the create command 402 includes a command identifier (e.g., "PUT") followed by a sequence of values indicating a location of the blocks on which the create command 402 should be performed.

In the example shown, the create command 402 includes a first location identifier (realmId), which may be used to identify a specific UDSF node or portion of data within a UDSF node that the network function can access. The create command 402 further includes a second location identifier (storageId), which may be used to identify a specific volume of storage associated with the network function or some specific service or process of the network function. The create command 402 further includes record data (records), which may indicate metadata associated with operating data included within the specific record. The create command 402 may also include a third identifier (recordId), which may be used to identify a specific record of data associated with a particular session, discrete process of the network function, microservice, or associated domain. As noted above, the realm identifier, storage identifier, record information, and record identifier may refer to specific portions of data in accordance with the relevant specification associated with the UDSF hardware or defined structure of storage.

In addition to the location identifiers (e.g., realm ID, storage ID, record ID), the create command 402 may include an indicated block range (blockIdList). The block range may indicate a subset of blocks within the associated record. The block range may refer to a proper subset including some, but not all, of the blocks of the associated record. The block range may be identified based on block endpoints or may include a listing of all relevant blocks that are to be affected by the command. In this example, the create command 402 may cause the UDSF to execute the command by creating values for the indicated range of blocks without creating values for specific blocks outside of the indicated range.

FIG. 4B illustrates an example read command 404. In this example, the read command 404 may be associated with returning data currently stored in an identified subset of blocks without returning data within one or more blocks of a record outside the identified subset. As shown in FIG. 4B, the read command 404 includes a command identifier (e.g., "GET") followed by a sequence of values indicating a location of the blocks on which the read command 404 should be performed. As shown in FIG. 4B, the additional identifiers (e.g., realmId, storageId, records, recordId, and blockIdList) may refer to similar identifiers as the create command 402 discussed above. It will be appreciated that the similar identifiers in the read command 404 may be similarly used to identify a subset of blocks of data within a specific record on which the read command is to be performed.

FIG. 4C illustrates an example update command 406. In this example, the update command 406 may be associated with updating data currently stored in an identified subset of blocks without updating data within one or more blocks of the record outside the identified subset. As shown in FIG. 4C, the update command 406 includes a command identifier (e.g., "MOD") followed by a sequence of values indicating a location of the blocks on which the update command 406 should be performed. In one or more embodiments, the command identifier for the update command is the same as the command identifier for the create command (e.g., "PUT"). As shown in FIG. 4C, the additional identifiers (e.g., realmId, storageId, records, recordId, and blockIdList) may refer to similar identifiers as the create command 402 and read command 404 discussed above. It will be appreciated that the similar identifiers in the update command 406 may be similarly used to identify a subset of blocks of data within a specific record on which the update command is to be performed.

FIG. 4D illustrates an example delete command 408. In this example, the delete command 408 may be associated with deleting data currently stored in the identified subset of blocks without updating data within one or more blocks of the record outside the identified subset. As shown in FIG. 4D, the delete command 408 includes a command identifier (e.g., "DEL") followed by a sequence of values indicating a location of the blocks on which the delete command 408 should be performed. As shown in FIG. 4D, the additional identifiers (e.g., realmId, storageId, records, recordId, and blockIdList) may refer to similar identifiers as the create command 402, read command 404, and update command 406 discussed above. It will be appreciated that the similar identifiers in the delete command 408 may be similarly used to identify a subset of blocks of data within a specific record on which the delete command is to be performed.

As noted above, while not shown in FIGS. 4A-4D, one or more of the above commands may further include specific data values that are to be incorporated with the command. For example, where the operation command is a create command or a modify command, the respective command may additionally include values to use in creating the data blocks or replacing the values previously stored in the data blocks.

Figure 5:
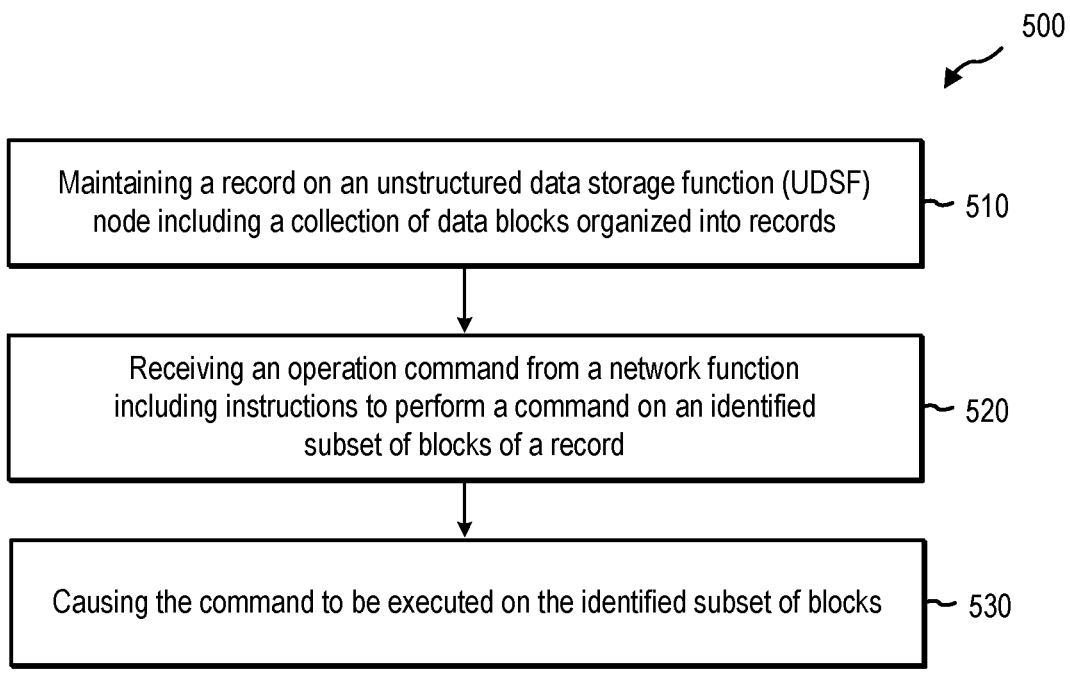
FIG. 5 illustrates an example series of acts related to receiving and processing an operation command on a UDSF node in accordance with one or more embodiments.

Turning now to FIG. 5, this figure illustrates an example flowchart including a series of acts for implementing features and functionalities described herein. In particular, FIG. 5 illustrates a series of acts related to extending functionality of UDSF nodes in supporting features and functionalities of services and applications that are accessible via a core network. While FIG. 5 illustrates acts according to one or more embodiments, alternative embodiments may omit, add to reorder, and/or modify any of the acts shown in FIG. 5. The acts of FIG. 5 may be performed as part of a method. Alternatively, a non-transitory computer-readable medium can include instructions thereon that, when executed by one or more processors, cause a server device and/or client device to perform the acts of FIG. 5. In still further embodiments, a system can perform the acts of FIG. 5.

FIG. 5 illustrates a series of acts 500 for receiving and processing operation commands on data stored in UDSF nodes (e.g., within a 3GPP environment). As shown in FIG. 5, the series of acts 500 includes an act 510 of maintaining a record on a UDSF node including a collection of data blocks organized into records. In one or more embodiments, the act 510 includes maintaining a first record on a first UDSF node, the first record including a set of blocks.

As further shown in FIG. 5, the series of acts 500 includes an act 520 of receiving an operation command from a network function including instructions to perform a command on an identified subset of blocks of a record. In one or more embodiments, the act 520 includes receiving, from a network function having authorized access to the first record, an operation command including an identifier of a subset of blocks from the set of blocks of the first record and instructions associated with performing a command on the identified subset of blocks.

As further shown in FIG. 5, the series of acts 500 includes an act 530 of causing the command to be executed on the identified subset of blocks. In one or more embodiments the act 530 includes causing the command to be executed on the identified subset of blocks from the operation command based on the instructions and the identifier of the subset of blocks. In one or more embodiments, causing the command to be executed is based on a single API call from the network function.

In one or more embodiments, the UDSF node is implemented on a core network hosted by a cloud computing system. In one or more embodiments, the network function and the UDSF node are implemented in a 5G (or beyond) cellular network.

In one or more embodiments, the series of acts 500 includes an act of maintaining a second record on the first UDSF node, the second record including a second set of blocks accessible to the network function. The first record may be associated with a first session for a service provided by the network function and the second record may be associated with a second session for the service provided by the network function. In one or more embodiments, the operation command includes a first record identifier associated with the first record and a block range identifier indicating the identified subset of blocks on which to perform the command.

In one or more embodiments, the operation command includes a command identifier indicating the command. The command may include a create command associated with inserting data into the identified subset of blocks without inserting data within one or more blocks of the set of blocks outside the identified subset. The command may include a read command associated with returning data currently stored in the identified subset of blocks without returning data within one or more blocks of the set of blocks outside the identified subset. The command may include an update command associated with updating data currently stored in the identified subset of blocks without updating data within one or more blocks of the set of blocks outside the identified subset. The command may include a delete command associated with deleting data currently stored in the identified subset of blocks without deleted data within one or more blocks of the set of blocks outside the identified subset.

In one or more embodiments, the operation command includes a sequence of identifiers that, when provided within an operation command, are usable to locate the identified subset of blocks within the first record, wherein the sequence of identifiers including a realm identifier, a storage identifier, a record identifier, and a block range identifier identifying a range of blocks from a corresponding record.

In one or more embodiments, the sequence of identifiers is defined based on specifications of a UDSF interface, the sequence of identifiers being usable by the network function to access data maintained on the first UDSF node. In one or more embodiments, the realm identifier is a unique node identifier associated with the first UDSF node. In one or more embodiments, the storage identifier is a unique function identifier associated with an instance of the network function. In one or more embodiments, the record identifier is a unique session identifier associating the first record with a session of the network function.

Figure 6:
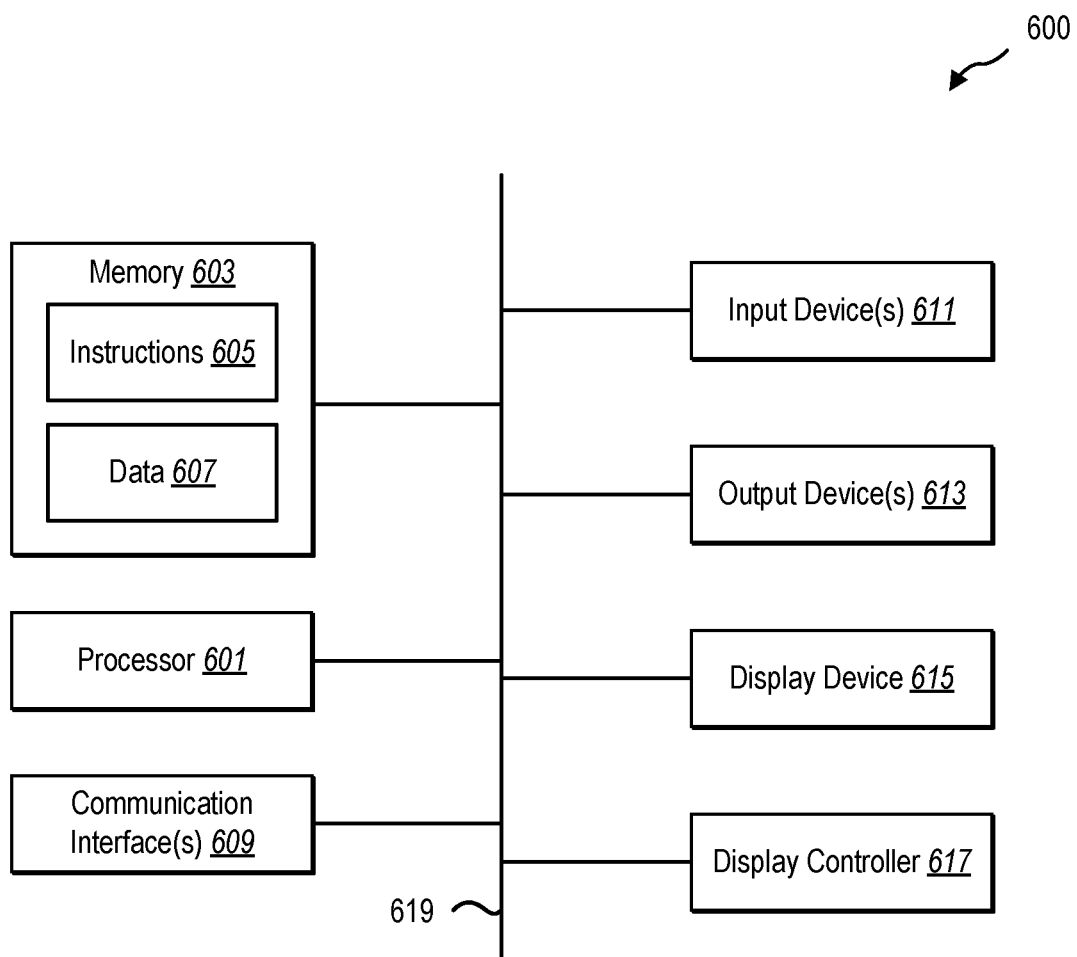
FIG. 6 certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD- ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. In a fifth-generation (5G) cellular network environment including unstructured data storage resources accessible to function entities, a method for receiving and processing operation commands on data stored in unstructured data storage function (UDSF) nodes, the method comprising:
    maintaining a first record on a first UDSF node, the first record including a set of UDSF data blocks that are stored and maintained on the first UDSF node, the first UDSF node being implemented in a 5G cellular network;
    receiving, from a network function having authorized access to the first record and via a single application programming interface (API) call from the network function, an operation command including an identifier of a subset of two or more UDSF data blocks from the set of UDSF data blocks of the first record and instructions associated with performing a command on the identified subset of two or more UDSF data blocks; and
    causing the command to be executed on the identified subset of two or more UDSF data blocks from the operation command based on the instructions and the identifier of the subset of two or more UDSF data blocks.

2. The method of claim 1, wherein the first UDSF node is implemented on a core network of the 5G cellular network.

3. The method of claim 1, wherein the operation command includes instructions associated with performing two or more modifications on the identified subset of two or more UDSF data blocks, wherein the method further comprises causing the two or more commands to be executed on the identified subset of two or more UDSF data blocks based on the single API call from the network function.

4. The method of claim 1, further comprising maintaining a second record on the first UDSF node, the second record including a second set of UDSF data blocks accessible to the network function, and wherein the first record is associated with a first session for a service provided by the network function, and wherein the second record is associated with a second session for the service provided by the network function.

5. The method of claim 4, wherein the operation command includes a first record identifier associated with the first record and a block range identifier indicating the identified subset of two or more UDSF data blocks on which to perform the command.

6. The method of claim 1, wherein the operation command includes a command identifier indicating the command, the command including one of:
    a create command associated with inserting data into the identified subset of two or more UDSF data blocks without inserting data within one or more UDSF data blocks of the set of UDSF data blocks outside the identified subset;
    a read command associated with returning data currently stored in the identified subset of two or more UDSF data blocks without returning data within one or more UDSF data blocks of the set of UDSF data blocks outside the identified subset;
    an update command associated with updating data currently stored in the identified subset of two or more UDSF data blocks without updating data within one or more UDSF data blocks of the set of UDSF data blocks outside the identified subset; or
    a delete command associated with deleting data currently stored in the identified subset of two or more UDSF data blocks without deleted data within one or more UDSF data blocks of the set of UDSF data blocks outside the identified subset.

7. The method of claim 1, wherein the operation command includes a sequence of identifiers that, when provided within the operation command, are usable to locate the identified subset of two or more UDSF data blocks within the first record, wherein the sequence of identifiers including a realm identifier, a storage identifier, a record identifier, and a block range identifier identifying a range of UDSF data blocks from a corresponding record.

8. The method of claim 7, wherein the sequence of identifiers is defined based on specifications of a UDSF interface, the sequence of identifiers being usable by the network function to access data maintained on the first UDSF node.

9. The method of claim 7, wherein the realm identifier is a unique node identifier associated with the first UDSF node.

10. The method of claim 7, wherein the storage identifier is a unique function identifier associated with an instance of the network function.

11. The method of claim 7, wherein the record identifier is a unique session identifier associating the first record with a session of the network function.

12. In a fifth generation (5G) cellular network environment including unstructured data storage resources accessible to function entities, a method for receiving and processing operation commands on data stored in unstructured data storage function (UDSF) nodes, the method comprising:
  maintaining a first record on a first UDSF node implemented in a core network of the 5G cellular network environment, the first record including a set of UDSF data blocks that are stored and maintained on the first UDSF node;
  receiving, from a network function implemented in the core network and via a single application programming interface (API) call from the network function, an operation command including an identifier of a subset of two or more UDSF data blocks from the set of UDSF data blocks of the first record and instructions associated with performing a command on the identified subset of two or more UDSF data blocks from the set of UDSF data blocks of the first record; and
  causing the command to be executed on the identified subset of two or more UDSF data blocks from the operation command based on the instructions and the identifier of the subset of two or more UDSF blocks.

13. The method of claim 12, wherein the operation command includes a command identifier indicating the command, the command including one of:
  a create command associated with inserting data into the identified subset of two or more UDSF data blocks without inserting data within one or more UDSF data blocks of the set of two or more UDSF data blocks outside the identified subset;
  a read command associated with returning data currently stored in the identified subset of two or more UDSF data blocks without returning data within one or more UDSF data blocks of the set of UDSF data blocks outside the identified subset;
  an update command associated with updating data currently stored in the identified subset of two or more UDSF data blocks without updating data within one or more UDSF data blocks of the set of UDSF data blocks outside the identified subset; or
  a delete command associated with deleting data currently stored in the identified subset of two or more UDSF data blocks without deleted data within one or more UDSF data blocks of the set of UDSF data blocks outside the identified subset.

14. The method of claim 12, wherein the operation command includes a sequence of identifiers that, when provided within the operation command, are usable to locate the identified subset of two or more UDSF data blocks within the first record, wherein the sequence of identifiers including a realm identifier, a storage identifier, a record identifier, and a block range identifier identifying a range of UDSF data blocks from a corresponding record.

15. The method of claim 14,
  wherein the realm identifier is a unique node identifier associated with the first UDSF node,
  wherein the storage identifier is a unique function identifier associated with an instance of the network function, and
  wherein the record identifier is a unique session identifier associating the first record with a session of the network function.

16. The method of claim 12, wherein the operation command includes a sequence of identifiers that, when provided within the operation command, are usable to locate the identified subset of two or more UDSF data blocks within the first record, wherein the sequence of identifiers including a realm identifier, a storage identifier, a record identifier, and a block range identifier identifying a range of UDSF data blocks from a corresponding record.

17. In a fifth generation (5G) cellular network environment, a system, comprising:
  at least one processor;
  memory in electronic communication with the at least one processor; and
  instructions stored in the memory, the memory being executable by the at least one processor to cause an unstructured data storage function (UDSF) node to:
    maintain a first record on a the UDSF node implemented in a core network of the 5G cellular environment, the first record including a set of UDSF data blocks that are stored and maintained on the UDSF node;
    receive, from a network function implemented in the core network and via a single application programming interface (API) call from the network function, an operation command including an identifier of a subset of two or more UDSF data blocks from the set of UDSF data blocks of the first record and instructions associated with performing a command on the identified subset of two or more UDSF data blocks from the set of UDSF data blocks of the first record; and
    cause the command to be executed on the identified subset of two or more UDSF data blocks from the operation command based on the instructions and the identifier of the subset of two or more UDSF data blocks.

18. The system of claim 17, wherein the operation command includes a command identifier indicating the command, the command including one of:
  a create command associated with inserting data into the identified subset of two or more UDSF data blocks without inserting data within one or more UDSF data blocks of the set of UDSF data blocks outside the identified subset;
  a read command associated with returning data currently stored in the identified subset of two or more UDSF data blocks without returning data within one or more UDSF data blocks of the set of UDSF data blocks outside the identified subset;
  an update command associated with updating data currently stored in the identified subset of two or more UDSF blocks without updating data within one or more UDSF data blocks of the set of UDSF data blocks outside the identified subset; or
  a delete command associated with deleting data currently stored in the identified subset of two or more UDSF data blocks without deleted data within one or more UDSF data blocks of the set of UDSF data blocks outside the identified subset.

19. The system of claim 17, wherein the operation command includes a sequence of identifiers that, when provided within the operation command, are usable to locate the identified subset of two or more UDSF data blocks within the first record, wherein the sequence of identifiers including a realm identifier, a storage identifier, a record identifier, and a block range identifier identifying a range of UDSF data blocks from a corresponding record.

20. The system of claim 19,
  wherein the sequence of identifiers is defined based on specifications of a UDSF interface, the sequence of identifiers being usable by the network function to access data maintained on the first UDSF node, wherein the realm identifier is a unique node identifier associated with the first UDSF node, wherein the storage identifier is a unique function identifier associated with an instance of the network function, and wherein the record identifier is a unique session identifier associating the first record with a session of the network function.

* * * * *